United States Patent [19]

Fowler

[11] 4,413,211
[45] Nov. 1, 1983

[54] CONTROL CIRCUIT FOR ELECTRICAL APPLIANCES

[76] Inventor: Ricky C. Fowler, 2426 Village Green, Garland, Tex. 75042

[21] Appl. No.: 333,637

[22] Filed: Dec. 23, 1981

[51] Int. Cl.³ .............................................. H02P 7/74
[52] U.S. Cl. .................................... 318/257; 318/336; 318/51
[58] Field of Search .................... 318/51, 70, 255, 257, 318/305, 336, 581, 596; 328/138, 163, 440–442

[56] References Cited

U.S. PATENT DOCUMENTS 3,943,421  3/1976  Shibata et al. ..................... 318/305
4,328,540  5/1982  Matsuoka et al. .................. 318/266

Primary Examiner—J. V. Truhe
Assistant Examiner—A. Evans
Attorney, Agent, or Firm—Thomas L. Cantrell; Joseph H. Schley; Stanley R. Moore

[57] ABSTRACT

A circuit for controlling a ceiling-type fan includes a switch or relay for controlling the fan, connectable to the fan. A logic circuit produces an output signal for controlling the switch or relay from an input signal generated by momentarily interrupting the power applied to an input to the logic circuit. A diode and capacitor isolate the power supply connections of the circuit to maintain the supply voltage during the momentary power interruptions.

In one embodiment the control circuit controls the on-and-off switching of the fan, as well as its speed, together with on-and-off switching of a light associated with the fan. In one embodiment the forward and reverse directions of the fan are controlled as well.

14 Claims, 3 Drawing Figures

CONTROL CIRCUIT FOR ELECTRICAL APPLIANCES

BACKGROUND OF THE INVENTION

1. Field of the Invention

This invention relates to improvements in controls for electrical appliances or devices, and, more particularly, to such controls which are suitable for use in controlling electrical fan motors or the like in speed and direction, and in addition to control the fan in combination with other electrical apparatus.

2. Description of the Prior Art

Recently, with increased emphasis upon fuel economy, electrical ceiling fans have become of popular and wide-spread usage.

Typically, ceiling fans are connected onto an overhead light fixture to be operated by wall mounted light switches. Often times, such ceiling fans are provided with speed controls, as well as direction controls, usually mounted directly upon the motor housing. Sometimes, especially when light fixtures are connected in combination with the fan fixture, separate light switches are provided on the fan housing assembly for independent control of such lights, as well. Typically, the fan motor and lights, if any, require a person to gain access to the control switches on the housing, either by standing upon a ladder or chair, or sometimes, by operation of strings or chains to the respective switches on the fan housing. The chair or ladder requirements can be sometimes hazardous, especially to elderly persons where a fall can be particularly dangerous. Strings or chains hanging from the fixture also can be annoying or distrubing to the decor of the room.

Alternatively, controls for operating an overhead ceiling fan and associated electrical accessories, such as lights or the like, have been mounted as a part of a wall switch, but with numerous control wires interconnecting the control switches and the fan and fan accessories being required. Such arrangement requires considerable wiring or re-wiring, as well as the provision of multi-conductor cables by which control can be had.

What is needed is a fan motor and accessory control system in which no special electrical wiring is needed other than that commonly used in the wiring of an overhead fixture to enable a fan motor to be controlled in its direction and speed, and to enable independent control of associated electronic apparatuses such as lights or the like.

One circuit which has been advanced by Applicant to solve many of these problems is set forth in copending patent application Ser. No. 318,393, filed Nov. 5, 1981, entitled Remote Load Selector Circuit and Method.

BRIEF DESCRIPTION OF THE INVENTION

In view of the above, it is, therefore, an object of the invention to provide an improved means for controlling the direction and speed of an electrical appliance such as an overhead fan or the like.

It is another object of the invention to provide a control means of the type described which can be employed with existing light fixture wiring, or which requires no additional wiring to that commonly found with existing light fixtures, which enables a fan to be controlled by a wall mounted switch.

It is another object of the invention to provide a control means of the type described in which a fan motor and associated lighting accessories can be separately controlled.

These and other objects, features and advantages will become apparent to those skilled in the art from the following detailed description when read in conjunction with the accompanying drawings and appended claims.

In its broad aspect, the invention advances a circuit for connection to an electrical device, such as ceiling type fan, or the like, to control the device. The circuit includes a switch means responsive to a control signal connectable to the electrical device to control it. Means are provided for generating a control signal connected to control the switch means and having an input for producing a change in the generated control signal when a signal level change is applied to the input. A manual switch is provided connected to means connected to the input of the control signal generating means for producing an input signal thereto, operative to produce a signal level change in response to the operation of the manual switch.

BRIEF DESCRIPTION OF THE DRAWINGS

The invention is illustrated in the accompanying drawing in which.

DETAILED DESCRIPTION OF THE PREFERRED EMBODIMENTS

Figure 1:
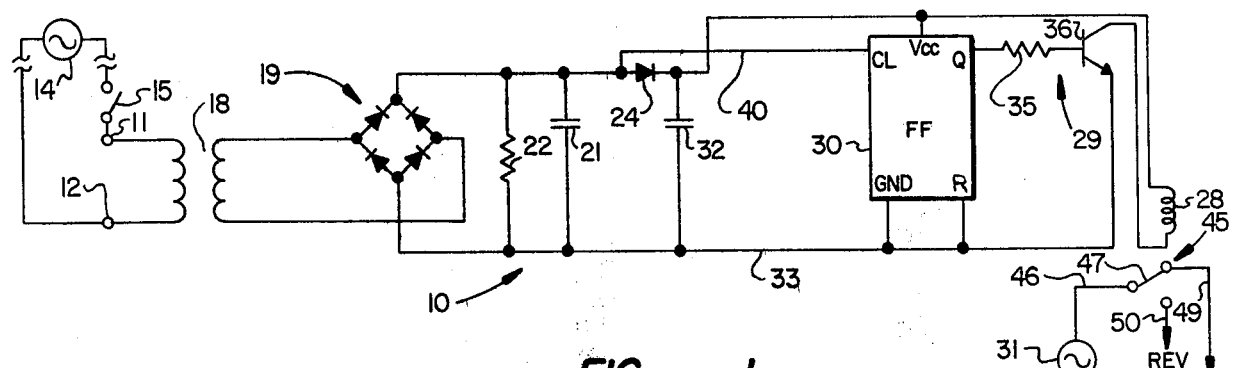
FIG. 1 is a schematic diagram of a motor direction controlling circuit, in accordance with the preferred embodiment of the invention.

One embodiment of the control circuit, in accordance with the invention as shown in FIG. 1, for controlling the forward or reverse direction of a fan motor with which it is associated. The circuit is designated by the general reference 10, and is intended for mounting within the fan or motor housing with which it is associated. As shown, terminals 11 and 12 are provided for connection to an AC source, such as the AC wires of a light or other fixture to which the fan is mounted. As shown, the terminals 11 and 12 can be connected to an AC source 14, which typically can be an AC power source, such as 120 volts typically found in commercial and residential power wiring. A switch 15 is provided on the hot side of the wiring which can be, for example, a wall switch or the like.

The 120 volts source is applied to a step down transformer 18 to step the voltage down to an appropriate low level voltage, such as 12 volts AC (depending upon the voltage requirements of the circuit elements used). The secondary winding of the step down transformer 18 is connected across a rectifier bridge 19 to provide DC power to the control circuit, below described. A capacitor 21 and a resistor 22 are connected in parallel across the bridge circuit 19 to filter the rectified voltage developed upon the bridge 19. A diode 24 is connected between the bridge 19 and the fan direction control circuitry to isolate the fan direction control circuitry from changes in the voltage which may appear at the bridge circuit 19, such changes being anticipated as a part of the operation of the circuit, as below described.

The fan control direction circuitry includes a relay 28, a transistor drive circuit 29 for controlling the relay 28 and, in the embodiment illustrated, an RST flip-flop 30, the logic state on the output of which controls the transistor drive circuit 29. The cathode of the diode 24 is connected to the power input terminal, $V_{cc}$, of the flip-flop 30 and to the coil of the relay 28. A capacitor 32 is connected from the cathode of the diode 24 to a common return line 33. The capacitor 32 is relatively large and operates to charge to the voltage developed by the bridge circuit 19, and to maintain the voltage developed on the flip-flop 30 and relay coil 28, despite variations caused by momentary interruptions of the voltage on the diode bridge 19.

Additionally, the Q output of the flip-flop 30 is connected via a resistor 35 to the base of a control transistor 36. The emmitter and collector of the control transistor 36 are connected in series with the relay coil 28, thereby to control the current flow through the relay coil 28 in accordance with the logic state upon the output Q of the flip-flop 30. Thus, when the Q state of the flip-flop is high, the transistor 36 is biased into conduction allowing current to flow through the relay coil 28. On the other hand, when the Q output of the flip-flop 30 is low, no current flows through the transistor 36 and, therefore, no current flows through the relay coil 28.

The top side of the diode bridge 19 is connected by a line 40 to the clock input of the flip-flop 30. By the appropriate selection of the size of the capacitor 21 and resistor 22, momentary interruptions in the power supplied to the circuit, such as by toggleing the switch 15, will produce sufficient voltage changes upon the line 40 to cause the flip-flop 30 to be clocked, and to change output states in accordance with its predefined operation. (As mentioned above, since capacitor 32 is relatively large, such toggleing does not affect the supply voltage to the flip-flop 30 and relay coil 28.)

Finally, the switch portion of the relay 28 is illustrated generally by the reference numeral 45, and, in the embodiment illustrated, is shown with a wire 46 connected to an AC "hot" line, or AC source 31, as shown, with a switch portion 47 arranged to switch between a forward control line 49 and a reverse control line 50 depending upon whether or not current is flowing through the relay coil 28.

In operation, when power is initially applied to the circuit 10 by closing the switch 15, the Q output of the flip-flop 30 will be at a low state. There, will therefore, be no current flowing through the relay coil 28 and the switch mechanism 45 controlling the fan will have the switch 47 in contact with the forward control line 49, thereby allowing the fan to run in a forward direction. If the switch 15 is momentarily toggled, or turned off and on, the DC voltage developed by the diode bridge 19 will momentarily fall and rise. The change from a high voltage to a low or zero voltage, conducted to the clock input of the flip-flop 30 by line 40 will cause the flip-flop 30 to change output states. When the output state Q of the flip-flop 30 assumes a high logic state, the transfer control circuit 29 will cause a current to flow through the relay coil 28, pulling the relay switch 47 to contact the reverse control line 50 of the fan. As mentioned, the momentary toggleing of the switch 15 does not affect the power supply voltage to the flip-flop 30 and relay coil 28 because of the large size of the capacitor 32.

Figure 2:
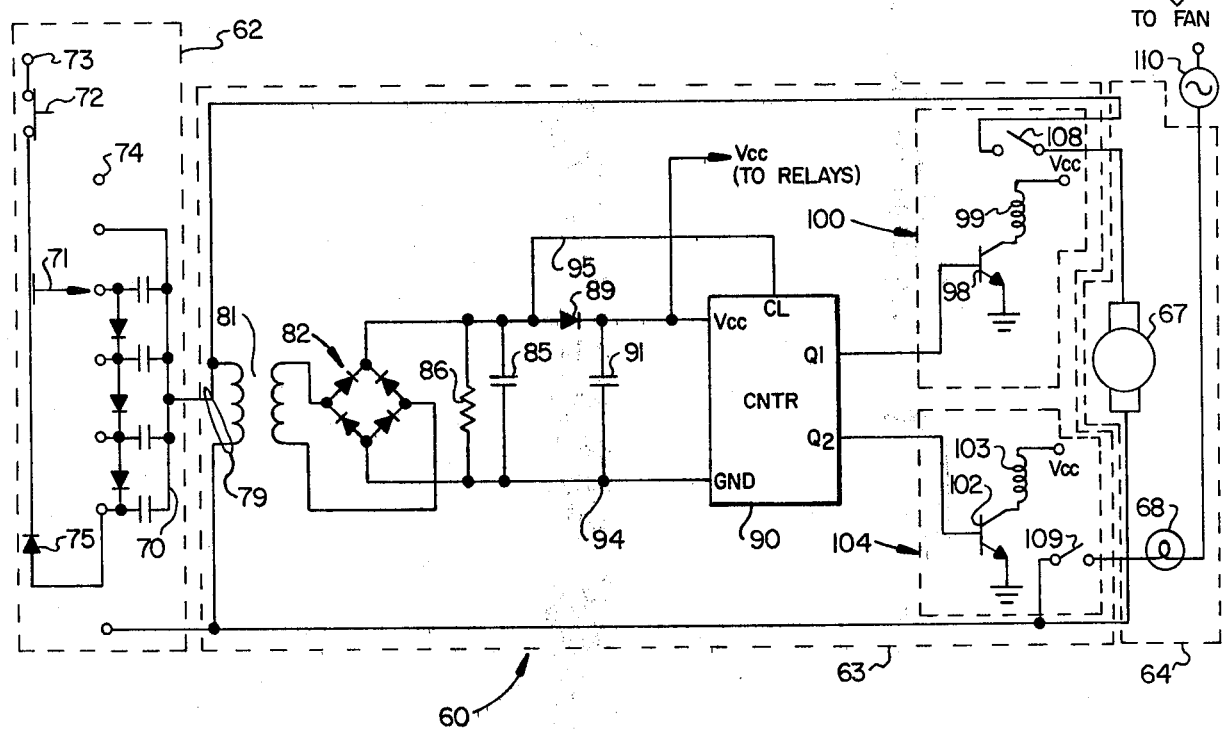
FIG. 2 is a schematic diagram of a motor control circuit, in accordance with the preferred embodiment of the invention, which can control the speed of an associated motor as well as additional electrical circuitry.

The control circuit in accordance with the invention can be used in addition to controlling the direction of the fan motor with which it is associated to control other associated appliances, such as light fixtures or the like which may be attached or otherwise associated with a fan. Such control circuit is shown, for example, in FIG. 2, and is designated by the general reference numeral 60. The control circuit 60 includes three general sections, as shown by dotted lines, a first section 62 being associated with a wall switch and being mounted within the wall, a second section 63 being locatable in the fan housing, and a third section 64, being the electrical appliances controlled by the circuit 60. In the embodiment illustrated, the control circuitry 60 is connected to control a motor 67 of a fan, and, additionally, a light 68 associated with the fan. At this juncture it should be pointed out that although a light fixture is described as being associated with the fan, it need not be formally associated; that is, the association is an electrical association arising by virtue of the common control circuit 60, not necessarily a physical connection between a light and fan. The light fixture may, for example be located at some distance from the fan if desired.

In the control circuit 60 with reference now to the wall mounted portion 62, a wall switch receptacle mounted speed control is provided which includes a capacitor diode-ladder network 70 and selection switch 71. The speed switch selection 71 is connected to an AC "hot" line 73, whereby the position of the switch 71 selects the capacitor of the ladder 70 which the AC power is applied. A normally closed push-button switch 72 is provided in series with the AC hot line 73 to the capacitor diode-ladder 70 to enable the power to the control circuit 60 to be toggled, in a manner below described in detail. A diode 75 is provided in series with toggle switch 72 and speed selection switch 71 to provide a discharge path for the capacitor diode-ladder and the to isolate the capacitor diode-ladder in a master off position 74. The AC voltage from the speed control circuit 60 is conducted upon a pair of wires to the control circuit 60. The pair of wires are encircled in the drawing and are indicated by the reference numeral 79, and can be conveniently the 120 volt wires ordinarily found in house wiring. The wires 79 are connected to a step-down transformer 81, which reduces the voltage to the control circuit 60, for example, from 120 volts to 12 volts AC. A full-wave bridge rectifier 82 is provided to rectify the stepped-down voltage for application to the control circuit 63, and a capacitor 85 and a resistor 86 are connected in parallel across the full-wave bridge rectifier circuit 82 to filter the voltage produced by the bridge 82. The resistor and the capacitor are selected in size to enable a momentary disruption in power to produce a decrease in voltage to produce an effective clock pulse, as below described, but are large enough to filter the ripple effects produced by the full-wave bridge circuit 82. The top of the full-wave bridge 82 is connected by a diode 89 to the voltage supply terminal of a divider or counter circuit 90. The anode of a diode 89 is connected by a line 95 to the clock output of the counter or divider 90. A capacitor 91 is connected from the cathode of the diode 89 to the bottom of the full-wave bridge upon a common return line 94. The capacitor 91 is of sufficiently large size to minimize the effects caused by a momentary power failure or perturbations on the cathode of the diode 89 to thereby maintain the voltage to the counter or divider 90 despite such voltage failures or perturbations.

The counter or divider 90 illustrated has two outputs, designated $Q_1$ and $Q_2$, and operates to produce a signal output upon output $Q_1$ respresenting a division by two of the number of clock pulses applied to the clock input terminal. In a similar fashion, the output $Q_2$ produces upon its terminal a signal which represents the number of clock pulses applied to the clock terminal divided by four. (If desired, additional outputs can be employed to operate additional control relays for other associated electrical apparatuses, as needed, not shown.)

The output terminal $Q_1$ is connected to the base of a control transistor 98, the emitter and collector of which are connected in series with a coil 99 of a relay circuit 100, connected to control the motor 67 of the fan, as described below. Likewise, the output $Q_2$ is connected to the base of a transistor 102 the emmitter and collector of which are connected in series with the coil 103 of a relay circuit 104 for controlling a light 68 associated with the fan.

The contacts 108 of the relay 100 are connected in series with the output of the fan speed control circuit 62 and with the motor 67 of the fan to be controlled. Likewise, the relay contacts 109 of the relay 104 connected in series with the light 68 and an AC source 110.

Figure 3:
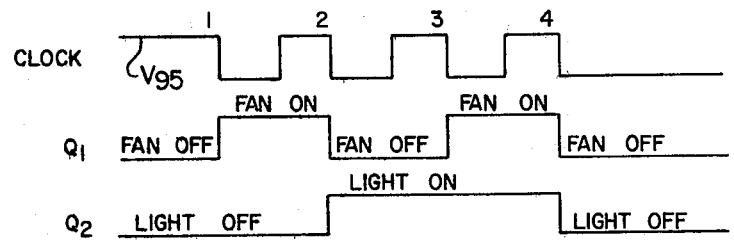
FIG. 3 is a diagram showing the interrelationship of various wave forms at selected points in the circuit of FIG. 2.

In the following description of the operation of the circuit 60, the wave forms set forth in FIG. 3 are referred to by way of explanation. When the power is initially applied to the circuit 60 by operation of the speed control circuit 62, the relay contacts 108 and 109 of relays 100 and 104, respectively, are open. When the toggle switch 72 is operated one time, the voltage upon the line 95 decreases to produce a clocking pulse on the counter or divider 90, as shown by the wave form $V_{95}$ in FIG. 3. Upon the first clocking pulse, the output $Q_1$ changes state, as shown by the wave form labeled $Q_1$ in FIG. 3, to operate relay circuit 100 to close the contact 108, thereby turning on the fan motor 67. The speed of the fan motor 67 will be as selected by the speed selection switch 71. At this time, the output $Q_2$ of the counter or divider 90 remains low, as shown by the wave form labeled $Q_2$ in FIG. 3. The light 68, therefore, remains off.

When the toggle switch 72 is toggled a second time, a second clock pulse is applied to the counter or divider 90 producing a change in state of the output $Q_1$ from high to low and of output $Q_2$ from low to high. In this condition, the contacts 108 of relay 100 are open, thereby turning off the motor 67, but the contacts 109 of the relay 104 are closed, to turn on the light 68.

When the toggle switch 72 is operated a third time, the output $Q_1$ changes state from low to high to thereby operate relay 100, again turning on the fan motor 67, and the output $Q_2$ remains high, continuing the operation of relay 104 enabling the light 68 to stay on.

When the toggle switch 72 is operated a fourth time, both outputs $Q_1$ and $Q_2$ change to a low state, again causing contacts 108 and 109 of relays 100 and 104, respectively, to open, turning off both the motor 67 and light 68.

It should be noted that as a particular advantage of the motor control circuit, the AC power to the contacts 108 of the relay 100 which controls the motor circuit 67 are derived from the output of the wall selection switch 62. Thus, in the various switching conditions between the motor 67 and light 68, when the toggle switch 72 is opened, voltage is removed from the contact 108 (although not necessarily from the relay coil 99). Thus, if a switching procedure is initiated which causes the opening or closing of the contacts 108, such opening or closing action is effected with no voltage applied to the contacts 108. This results in eliminating switching arcing and its attendant disadvantages upon relay contacts 108.

Although the invention has been described with respect to the control and operation of a ceiling fan and attendant or associated lighting fixtures, the control circuit of the invention can be equally advantageously employed to control any electrical circuits from a remote location via a single pair of wires, and is not intended to be limited merely to fan control usage. Many additional applications will become apparent to those skilled in the art upon inspection of the circuitry as above described.

Although the invention has been described and illustrated with a certain degree of particularity, as noted, it is understood that the present disclosure has been made by way of example only and that numerous changes in the details of construction and combination and arrangement of parts may be resorted to without departing from the spirit and scope of the invention as hereinafter claimed.

I claim:

1. A circuit for connection to a ceiling-type fan to control same comprising:
   switch means responsive to a control signal, connectable to the fan to control the fan,
   means for generating a control signal connected to control said switch means, and having an input for producing a change in the generated control signal responsive to a signal level change applied to the input,
   a manual switch connected to apply an AC source to said input signal producing means and wherein said input signal producing means comprises means for converting a voltage of the AC source to a DC voltage having a first level when said manual switch is open and a second level when said manual switch is closed, whereby operation of said manual switch produces an interruption of said DC voltage to create a control signal to control said electrical device,
   means connected to the manual switch and to the input of said control signal generating means for producing an input signal thereto, operative to produce a signal level change in response to the operation of said manual switch,
   diode isolation means connected to receive the DC voltage and a capacitor connected to receive the DC voltage said capacitor connected to said diode to be charged by said DC voltage, said diode being connected to supply DC voltage to said control signal generating means and to said switch means, said capacitor being isolated by said diode isolation means from discharging into said AC converting means and being sufficiently large as to not discharge upon the occurrence of said control signal.

2. The circuit of claim 1 wherein said switch means is a relay.

3. The circuit of claim 2 wherein said means for generating a control signal comprises a logic circuit.

4. The circuit of claim 3 wherein said logic circuit is a flip-flop circuit.

5. The circuit of claim 3 wherein said logic circuit is a logic counter circuit.

6. The circuit of claim 3 wherein each logic circuit is a logic divider circuit.

7. The circuit of claim 3 further comprising a transistor drive circuit connected to an output of the logic circuit and to the switch means to control the switch means in response to the output of the logic circuit.

8. A circuit powered by an AC source for controlling the operation of a ceiling-type fan, adapted for connection to a remotely located switch, comprising:
- a rectifier means to which a voltage of the AC source is selectively applied by said switch, to produce a DC voltage,
- a diode connected to said rectifier means,
- a capacitor connected to said diode to be charged by said DC voltage for maintaining said DC voltage at said diode upon interruption of said DC voltage produced by said rectified means,
- a logic circuit having an input and at least one output which produces a logic state in a pre-determined relationship to a change in logic state upon said input, said input being connected to receive the DC voltage produced by said rectifier means, whereby an interruption of DC voltage produces a logic state change upon said input, said logic circuit being connected to said diode and capacitor to receive an uninterrupted DC supply voltage therefrom,
- and at least one relay connected to be controlled by the logic state output of said at least one output, and connected to control the operation of the fan, whereby the operation of said switch controls the operation of the fan.

9. The circuit of claim 8 wherein the remotely located switch comprises a fan motor speed control, and said fan is connected to receive AC power from said AC source controlled by said remotely located switch.

10. The circuit of claim 8 wherein said at least one output of said logic circuit is two in number, wherein said at least one relay is two in number, and further comprising an electrical light circuit, the fan being associated with one of said relays and said light circuit being associated with another of said relays.

11. The circuit of claim 10 wherein said logic circuit is a logic divider circuit and wherein said two outputs produce respectively state changes corresponding to the number of input logic state changes divided by two and divided by four.

12. The circuit of claim 8 wherein at least one relay is connected to control the direction of the fan.

13. A circuit for connection to an AC source for controlling a ceiling-type fan and associated light comprising:
- a motor speed control circuit connected to receive an AC voltage from said AC source, having an output for connection to the fan motor,
- a switch associated with said motor speed control to produce, upon operation, a voltage level change at the output of said motor speed control,
- a transformer connected to the output of said motor speed control to produce a stepped-down AC voltage,
- a rectifier connected to said transformer to produce a DC voltage from said stepped-down AC voltage,
- a filter connected said rectifier,
- a diode connected to said rectifier to produce a DC supply voltage,
- a capacitor connected to said diode to maintain the DC supply voltage upon interruption of the DC voltage produced by said rectifier,
- a logic circuit having a clock input, and two logic outputs, said logic circuit being connected to receive DC supply voltage from said diode, one logic output producing a logic state change upon the occurance of two state changes upon the input, and the other logic output producing a logic state change upon the occurance of four state changes upon the input, the input being connected to receive said DC voltage produced by said rectifier, whereby when said switch associated with said motor speed control is operated a state change is applied to said input, and
- two relay circuits, each connected to a respective one of said logic outputs, one of said relay circuits connecting said fan and said motor speed control, and another of said relay circuits connecting a second electrical appliance to said AC source.

14. The circuit of claim 13 wherein said motor speed control comprises a capacitor diode-ladder and a selection switch operable to select among the capacitor diodes of said ladder to control the speed of the fan.

* * * * *